United States Patent
Sato et al.

(10) Patent No.: US 11,750,771 B2
(45) Date of Patent: Sep. 5, 2023

(54) RECORDING CONTROL APPARATUS, RECORDING CONTROL METHOD, AND RECORDING CONTROL PROGRAM

(71) Applicant: JVCKENWOOD Corporation, Yokohama (JP)

(72) Inventors: Takayuki Sato, Yokohama (JP); Junichi Kasuya, Yokohama (JP); Kodai Nakamura, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 17/854,119

(22) Filed: Jun. 30, 2022

(65) Prior Publication Data
US 2022/0329751 A1 Oct. 13, 2022

Related U.S. Application Data (63) Continuation of application No. PCT/JP2020/043369, filed on Nov. 20, 2020.

(30) Foreign Application Priority Data

Jan. 6, 2020 (JP) .................. 2020-000383

(51) Int. Cl.
*H04N 5/77* (2006.01)
*G11B 27/10* (2006.01)
*H04N 5/91* (2006.01)

(52) U.S. Cl.
CPC ............. *H04N 5/77* (2013.01); *G11B 27/102* (2013.01); *H04N 5/91* (2013.01)

(58) Field of Classification Search
CPC ........... H04N 5/77; H04N 5/91; G11B 27/102
See application file for complete search history.

(56) References Cited

U.S. PATENT DOCUMENTS

| | | | | |
|---|---|---|---|---|
| 2015/0262617 A1* | 9/2015 | Jaime | .............. | H04N 5/77 386/241 |
| 2015/0318020 A1* | 11/2015 | Pribula | .............. | H04N 21/2743 386/290 |

(Continued)

FOREIGN PATENT DOCUMENTS

JP 2015008483 A 1/2015

OTHER PUBLICATIONS

International Search Report for the corresponding PCT Application No. PCT/JP2020/043369 with English translation dated Feb. 16, 2021, 4 pages.

(Continued)

*Primary Examiner* — Sunghyoun Park
(74) *Attorney, Agent, or Firm* — Shih IP Law Group, PLLC (57) ABSTRACT

An image acquisition unit acquires a video of a scene around a vehicle while the video is being captured. A recording control unit sets a moving image file for recording the video being captured, segmenting the video into predetermined units and records the video being captured in the moving image file until the predetermined unit is met. When an operation reception unit receives a request to play back a just-before portion while the video is being recorded, the recording control unit sets a subsequent moving image file that will be a new recording destination and closes a preceding moving image file that has been a recording destination, and a display control unit plays back the video, starting at a point of time reached by going back from an end of the preceding moving image file by a predetermined period of time.

5 Claims, 3 Drawing Sheets

(56) References Cited

U.S. PATENT DOCUMENTS

2017/0280096 A1*  9/2017  Vayn ................ G11B 20/10527
2018/0218758 A1   8/2018  Maeda et al.
2020/0205997 A1*  7/2020  Stinchfield ................ A61F 2/44

OTHER PUBLICATIONS

International Preliminary Examination Report on Patentability (I) for the corresponding PCT Application No. PCT/JP2020/043369 with an English translation dated Jul. 12, 2022, 8 pages.
European Extended Search Report from EP Application No. 20911385.1 dated Apr. 14, 2023, 8 pages.

* cited by examiner

RECORDING CONTROL APPARATUS, RECORDING CONTROL METHOD, AND RECORDING CONTROL PROGRAM

CROSS REFERENCE TO RELATED APPLICATION

This application is a continuation of application of International Application No. PCT/JP2020/043369, filed on Nov. 20, 2020, and claims the benefit of priority from the prior Japanese Patent Application No. 2020-000383, filed on Jan. 6, 2020, the entire content of which is incorporated herein by reference.

BACKGROUND OF THE INVENTION

1. Field of the Invention

The present invention relates to a recording control apparatus, a recording control method, and a recording control program configured to record a video.

2. Description of the Related Art

Video recorders for television broadcast are generally configured for chase play whereby a program being recorded is played back from its head. Some drive recorders are equipped with a similar function (see, for example, patent literature 1).

[Patent Literature 1] JP2015-8483

In chase play, however, it is assumed that a video is played back from its head, and it is not assumed that an arbitrary portion other than the head is played back immediately. Moreover, the content that a passenger of a vehicle would like to play back immediately as it is captured during a travel is not necessarily the head portion of the video captured.

SUMMARY OF THE INVENTION

A recording control apparatus according to an embodiment of the present invention includes: an image acquisition unit that acquires a video of a scene around a vehicle while the video is being captured; a recording control unit that sets a moving image file for recording the video being captured and acquired by the image acquisition unit, segmenting the video into predetermined units and records the video being captured in the moving image file until the predetermined unit is met; a display control unit that plays back the video recorded in the moving image file; and a user operation reception unit that receives a user operation input from a user. When the user operation reception unit receives a request to play back a just-before portion from a user while the video is being recorded, the recording control unit sets a subsequent moving image file that will be a new recording destination of the video to switch to the new recording destination, and closes a preceding moving image file that has been a recording destination, and the display control unit plays back the video, starting at a point of time reached by going back from an end of the preceding moving image file by a predetermined period of time.

Another embodiment of the present invention relates to a recording control method. The method includes: acquiring a video of a scene around a vehicle while the video is being captured; setting a moving image file for recording the video being captured, segmenting the video into predetermined units; recording the video being captured in the moving image file until the predetermined unit is met; playing back the video recorded in the moving image file; and when a request to play back a just-before portion is received from a user while the video is being recorded, setting a subsequent moving image file that will be a new recording destination of the video to switch to the new recording destination, and closing a preceding moving image file that has been a recording destination, and playing back the video, starting at a point of time reached by going back from an end of the preceding moving image file by a predetermined period of time.

Optional combinations of the aforementioned constituting elements, and mutual substitution of constituting elements and implementations of the present invention between methods, apparatuses, systems, programs, etc. may also be practiced as additional modes of the present invention.

DETAILED DESCRIPTION OF THE PREFERRED EMBODIMENT

The invention will now be described by reference to the preferred embodiments. This does not intend to limit the scope of the present invention, but to exemplify the invention.

A description will be given of embodiments of the present invention with reference to the drawings. Specific numerical values are shown in the embodiments by way of example only to facilitate the understanding of the invention and should not be construed as limiting the scope of the invention unless specifically indicated as such. Those elements in the specification and drawings that have substantially identical functions and structures are represented by the same reference symbols, and the description is not duplicated. Elements not directly relevant to the invention are omitted from the illustration. In the following embodiments, a drive recorder and a navigation apparatus are mainly described as exemplifying the recording control apparatus.

Figure 1:
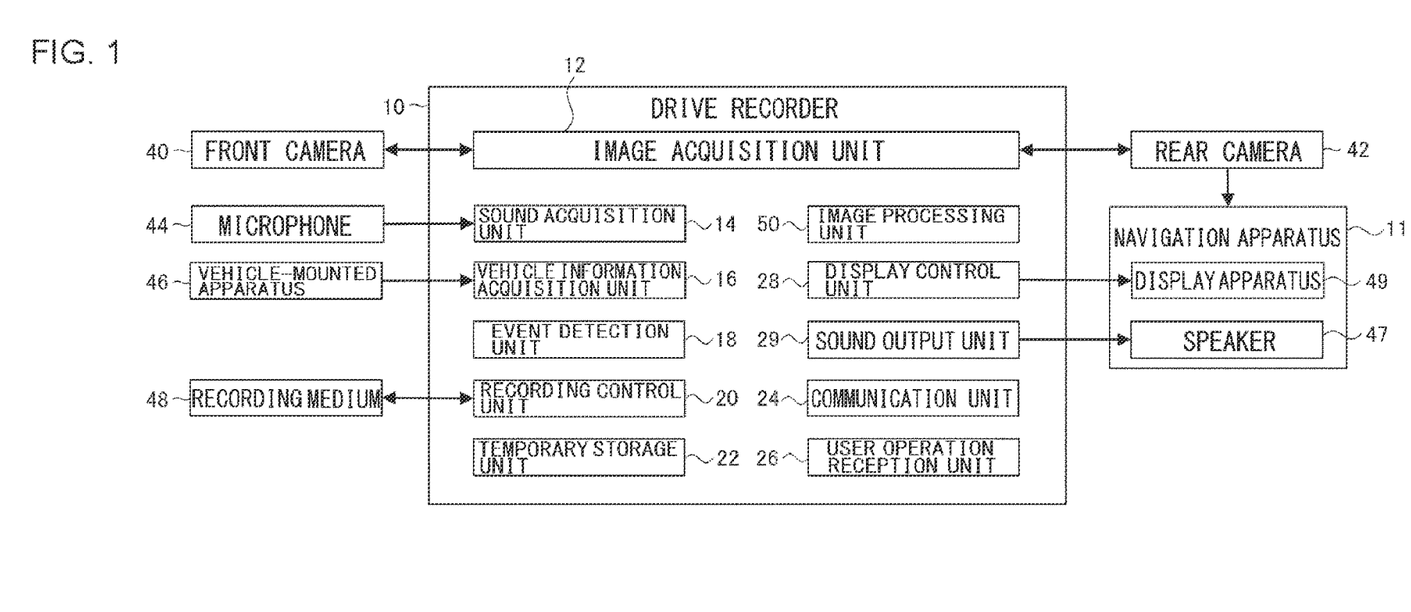
FIG. 1 is a block diagram schematically showing functional features of a drive recorder.
Figure 3:
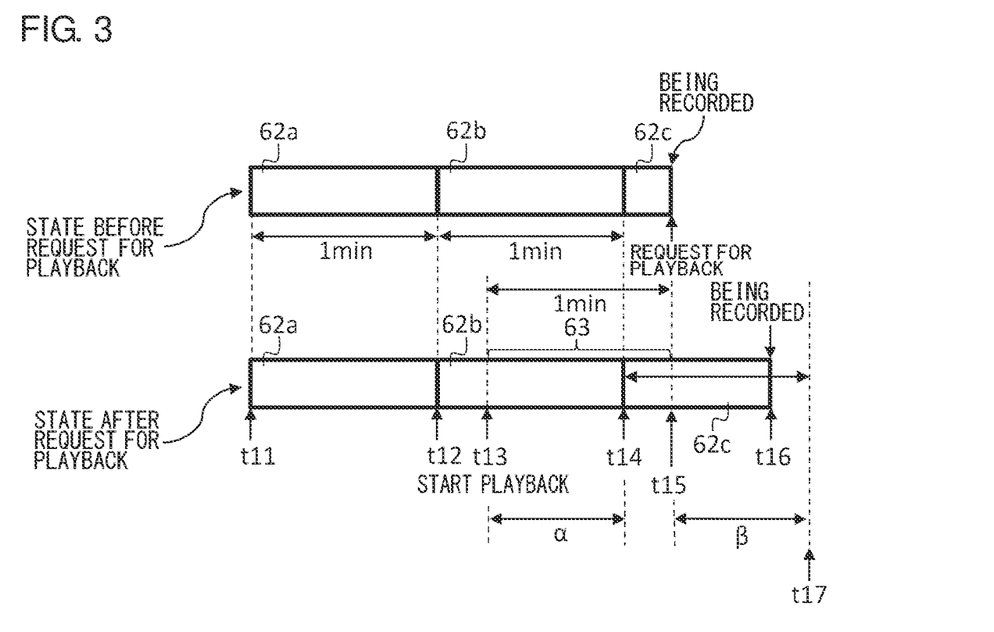
FIG. 3 shows the second example of temporal relationship between a video recording process and a playback process.

FIG. 1 is a block diagram schematically showing functional features of a drive recorder 10. The functional blocks depicted are implemented in hardware such as devices and mechanical apparatus exemplified by a CPU and a memory of a computer, and in software such as a computer program. FIG. 3 depicts functional blocks implemented by the cooperation of these elements. Therefore, it will be understood by those skilled in the art that these functional blocks may be implemented in a variety of manners by a combination of hardware and software.

The drive recorder 10 includes an image acquisition unit 12, a sound acquisition unit 14, a vehicle information acquisition unit 16, an event detection unit 18, a recording control unit 20, a temporary storage unit 22, a communication unit 24, a user operation reception unit 26, an image processing unit 50, a display control unit 28, and a sound output unit 29. The image acquisition unit 12 may be configured as a part of the vehicle information acquisition unit 16, or the image acquisition unit 12 may be included in the vehicle information acquisition unit 16. The drive recorder 10 is mounted on a vehicle. The communication unit 24 exchanges information with an external device by communicating therewith by wireless connection. The user operation reception unit 26 receives a user operation input from a user. The display control unit 28 controls the display of a captured video on a display apparatus 49. The display apparatus 49 is a monitor provided in the navigation apparatus 11. In one variation, the display apparatus 49 may be built in the drive recorder 10. Alternatively, a video may be displayed on the display apparatus provided in the vehicle (e.g., an infotainment system, an electronic mirror, a head-up display, etc. (not shown)) by superimposition or interruption. The sound output unit 29 controls sound output to a speaker 47 that outputs sound such as recorded sound and alert sound. The speaker 47 is a speaker provided in the navigation apparatus 11 or the vehicle. In one variation, the speaker 47 may be built in the drive recorder 10. The drive recorder 10 and the navigation apparatus 11 may be connected wirelessly via the communication unit 24 or connected by wire by a universal asynchronous receiver/transmitter (UART) or a universal serial bus (USB).

The image acquisition unit 12 acquires a video capturing the scene around the vehicle while the video is being captured. The image acquisition unit 12 acquires videos captured by a front camera 40 and a rear camera 42 provided in the vehicle. The front camera 40 is configured to capture an image of the scene around the vehicle, and, in particular, the scene in front of the driver's vehicle. The rear camera 42 is configured to capture an image of the scene around the vehicle, and, in particular, the scene behind the driver's vehicle. The front camera 40 may be configured to capture an image of the scene both in front of the driver's vehicle and inside the vehicle. Alternatively, the front camera 40 may be configured to globally capture an image of the scene in front of and beside the driver's vehicle and inside the vehicle and configured as a full-circumference camera capable of capturing an image of the scene 360° around. Still alternatively, the front camera 40 may be configured as a plurality of cameras capturing images of the scenes in front, behind, and beside. The front camera 40 and the rear camera 42 may be built in the drive recorder 10 or separate from the drive recorder 10. The rear camera 42 is a camera that feeds a video of the scene behind to the navigation apparatus 11, too, and functions as a camera both for the drive recorder 10 and the navigation apparatus 11.

The image acquisition unit 12 may acquire, as vehicle information related to the driving of the vehicle, the videos captured by the front camera 40 and the rear camera 42. Alternatively, the image acquisition unit 12 may be regarded as a part of the vehicle information acquisition unit 16. The image acquisition unit 12 acquires the video from the front camera 40. Further, the image acquisition unit 12 acquires the video from the rear camera 42 regardless of whether or not vehicle information indicating that gear is shifted into reverse is acquired. The display control unit 28 causes the display apparatus 49 to display the video from the front camera 40 while vehicle information indicating that the gear is shifted into a mode other than reverse (e.g., drive or parking) is acquired. While vehicle information indicating that the gear is shifted into reverse is acquired, the display apparatus 49 is caused to display the video from the rear camera 42. In one variation, the display apparatus 49 may be caused to continuously display not only the video from the front camera 40 but also the video from the rear camera 42 regardless of whether or not vehicle information indicating that the gear is shifted to reverse is acquired.

The sound acquisition unit 14 acquires sound data acquired by a microphone 44 provided in the vehicle. The microphone 44 is configured to collect sound from inside and outside the vehicle. The microphone 44 may be built in the drive recorder 10, separate from the drive recorder 10, or integrated with the front camera 40 or the rear camera 42. Alternatively, the microphone 44 may be built in the navigation apparatus 11. In the case the microphone 44 is built in the navigation apparatus 11, the microphone 44 is used for voice control of the navigation apparatus 11. The sound acquisition unit 14 may acquire, as vehicle information related to the driving of the vehicle, sound by means of the microphone 44. Alternatively, the sound acquisition unit 14 may be regarded as a part of the vehicle information acquisition unit 16.

The vehicle information acquisition unit 16 acquires vehicle information related to the driving of the vehicle from a vehicle-mounted apparatus 46 provided in the vehicle. Specific examples of the vehicle-mounted apparatus 46 include, but are not limited to, a vehicle speed sensor, steering angle sensor, accelerator position sensor, brake position sensor, acceleration sensor, gyro sensor, radar sensor, Light Detection and Ranging (LiDAR), position information sensor (e.g., GNSS; Global Navigation Satellite System), passenger seat sensor, etc. The vehicle information acquisition unit 16 may acquire vehicle information via various electronic control units (ECU) or may acquire vehicle information via the navigation apparatus 11. The vehicle information acquisition unit 16 may acquire position information from a position information sensor built in the navigation apparatus 11. The vehicle information acquisition unit 16 may acquire information detected various sensors such as an acceleration sensor, gyro sensor, and position information sensor built in the terminal of a user such as a cell phone via the communication unit 24. The vehicle information acquisition unit 16 may acquire information related to the driving of the vehicle from a sensor built in the drive recorder 10. For example, sensors like an acceleration sensor, a position information sensor, etc. may be built in the drive recorder 10. The front camera 40, the rear camera 42, or the microphone 44 may be regarded as one of vehicle-mounted apparatuses, and the vehicle information acquisition unit 16 may be configured to include the image acquisition unit 12 and the sound acquisition unit 14.

The vehicle information acquisition unit 16 acquires information related to the condition of the vehicle, information related to the manipulation of the vehicle, information related to the speed of the vehicle, information related to the position of the vehicle, information related to an obstacle around the vehicle, information related to the operating condition of the driving assistance function of the vehicle etc. from the vehicle-mounted apparatus 46. Various information acquired by the vehicle information acquisition unit 16 is information sensed by a sensor other than the camera, unlike the case of detecting an object around the vehicle by means of image recognition by an image processing unit 50 described later. The vehicle information acquisition unit 16 may acquire, as information related to the condition of the vehicle, information indicating whether the door or the window is open or closed. The vehicle information acquisition unit 16 may acquire, as information related to the manipulation of the vehicle, information indicating whether a user manipulation to request the door or the window to be opened or closed. The vehicle information acquisition unit 16 may acquire, as information related to an obstacle around the vehicle, information indicating whether a further vehicle is located within a certain range around the vehicle or whether a pedestrian, a bicycle, an obstacle such as a fallen object or a building is located on the traffic lane on which the vehicle is traveling. The vehicle information acquisition unit 16 may acquire information indicating whether a passenger is in the vehicle. The vehicle information acquisition unit 16 may acquire, as information related to the operating condition of the driving assistance function of the vehicle, information related to on/off of the automatic driving function or remote control function or information related to whether a particular driving assistance function is in operation. The driving assistance function is exemplified by, but is not limited to, adaptive cruise control (ACC) or lane keeping assistance system (LKAS).

The event detection unit 18 detects occurrence of various predefined events (hereinafter, "trigger events"), based on video data acquired by the image acquisition unit 12, sound data acquired by the sound acquisition unit 14, and vehicle information acquired by the vehicle information acquisition unit 16.

A serious incident such as a vehicle accident or trouble is assumed as a trigger event. A trigger event is a save-triggering event that triggers saving of video data as overwrite-disabled data in the event of its occurrence or detection. The event detection unit 18 detects, as a trigger event, occurrence of an accident such as collision, contact, overturn, and fall of a vehicle or of a trouble such as rude conduct and dangerous driving by the driver of a vehicle around. The event detection unit 18 may refer to video data acquired by the front camera 40 and the rear camera 42 or sound data acquired by the microphone 44 to detect occurrence of an accident or a trouble by image recognition or sound recognition based on a predetermined recognition pattern. The event detection unit 18 may refer to information such as traveling speed and acceleration of the vehicle and information related to manipulation of accelerator, brake, steering, etc. to detect the occurrence of a trigger event by recognizing an abrupt change in vehicle behavior caused by a sudden start, sudden stop, and sudden swinging. The event detection unit 18 may refer to video data of the front camera 40 and the rear camera 42, information from a radar sensor of the vehicle, etc. to detect the occurrence of a trigger event by recognizing approach to an object around the vehicle, deviation from a lane being traveled, etc., based on a predetermined recognition pattern. The event detection unit 18 may also detect the occurrence of a trigger event when the user operation reception unit 26 receives pressing of a save start button provided in the drive recorder 10 or an audio request designating start of saving.

The image processing unit 50 stores image recognition patterns for detecting various objects from an image in advance and detects an object captured in the image based on the image recognition pattern and by using a predetermined image recognition algorithm. The image recognition patterns may be defined by machine learning such as deep learning. Specifically, the image recognition patterns may be specialized for objects that can be captured by the camera of the drive recorder, and, for example, objects that can be located on a road or around such as a four-wheel vehicle, a two-wheel vehicle, a pedestrian, and an object installed on the road. The image processing unit 50 further recognizes a white line or a traffic lane on the road. Of the objects detected from an image captured by the rear camera 42, the image processing unit 50 detects, as a vehicle around, a vehicle such as a four-wheel vehicle and a two-wheel vehicle.

The recording control unit 20 temporarily stores in the temporary storage unit 22 the video data continuously captured by the front camera 40 or the rear camera 42 and acquired by the image acquisition unit 12, the sound data continuously collected by the microphone 44 and acquired by the sound acquisition unit 14, and the vehicle information acquired by the vehicle information acquisition unit 16. The recording control unit 20 records the video data and sound data stored in the temporary storage unit 22 in the recording medium 48 using the ring buffer scheme.

The temporary storage unit 22 may be a buffer memory comprised of a non-volatile memory such as a flash memory and a solid state drive (SSD) or a volatile memory such as DRAM. The recording medium 48 is a memory card such as an SD card (registered trademark) and is used by being inserted into a slot provided in the drive recorder 10 and configured to be removable from the drive recorder 10. The recording medium 48 may be comprised of an auxiliary storage device such as a solid state drive and a hard disk drive. An auxiliary storage device built in the navigation apparatus 11 may be used. The sound data stored in the temporary storage unit 22 and the sound data recorded in the recording medium 48 are stored or recorded in a format of a moving image file synthesized with the video data. However, a moving image file may be stored or recorded as soundless video data that does not contain sound data, depending on the mode selected by the user. Therefore, the "moving image file" as contemplated in the following description may or may not contain sound data, although an explanation is omitted.

The video data stored in the temporary storage unit 22 may be stored in a moving image file in a streaming format such as MPEG2-TS segmented at predetermined time intervals. The video data recorded in the recording medium 48 may have the same format as the moving image file stored in the temporary storage unit 22 or a different format, and, for example, a format having a higher compression rate such as an MP4 format.

The recording control unit 20 records the moving image file in the temporary storage unit 22 and the recording medium 48 using the ring buffer scheme. When the data recorded in the temporary storage unit 22 and the recording medium 48 fills the capacity, therefore, the oldest data is overwritten. The recording control unit 20 temporarily records the moving image file in the temporary storage unit 22 and the recording medium 48, assigning an overwrite-enabled attribute to the moving image file.

When the event detection unit 18 detects a trigger event, the recording control unit 20 sets an over-write disabled save format in, of the moving image files recorded in the recording medium 48, the moving image file in a time period at least including the point of time of detection of the trigger event. An overwrite-enabled or overwrite-disabled attribute may be set by, for example, writing the attribute in a predetermined flag, etc. included in the moving image file. Alternatively, the attribute may be set by writing an overwrite-enabled or disabled attribute in a management file such as an index independent of the moving image file. When an overwrite enabled or disabled attribute is written in the original moving image file itself, information indicating a start position and an end position of a period in the original moving image file saved with an overwrite-disabled option may be written. In this case, the portion other than the saved portion, i.e., the overwrite-enabled portion, is subsequently overwritten by further data such that the saved portion is consequently clipped from the start position to the end position and remains. Alternatively, distinction between overwrite-enabled and overwrite-disabled may be made by separately saving the saved portion in the form of an independent file created by clipping it from the original moving image file. When portions clipped as saved portions extend across multiple moving image files, a file concatenating the portions clipped from the respective moving image files may be saved. When the saved portion is separately saved in the form of an independent file, distinction between overwrite-enabled and overwrite-disabled may be made by recording it in a special area (e.g., in a special folder) different from the area in which the overwrite-enabled data is recorded. The data for which an overwrite-disabled attribute is set maintains a state of overwrite-disabled until the data is deleted or changed to an overwrite-enabled attribute by an explicit user operation.

The recording control unit 20 sets a moving image file as a container for recording the video being captured and acquired by the image acquisition unit 12, segmenting it into predetermined units. The predetermined unit is, for example, one minute. Recording of frame images in moving image files is segmented (i.e., recording of frame images in a moving image file is terminated) every one minute, whereupon a new moving image file is set. The recording control unit 20 records a plurality of frame images constituting the video being captured in a moving image file until the predetermined unit (e.g., one minute) is met. When a subsequent moving image file is newly set, the recording control unit 20 changes the video recording destination to the subsequent moving image file and closes the moving image file that has been the recording destination (the preceding moving image file). By appending information indicating an end to the end of a moving image file when it is closed, the recording control unit 20 makes it possible to play back the moving image file. The display control unit 28 plays back the video recorded in the moving image file.

The user may want to see a scene (e.g., a scenery that the driver overlooked while driving the vehicle, a landmark object that the user passed by, etc.) in the video once again. For example, cases are assumed in which the user passes by a traffic information presentation, a road guidance presentation, a road sign, a signboard, a site of accident, a destination, a place where the user wanted to make a turn, an availability of parking lot, a length of queue outside a restaurant, appearance of a person or an animal, etc. and wants to take another look. It was impossible to address cases like these in the related art. Even if a video is recorded by the drive recorder 10, it was impossible to instantly play back a scene that the user has just missed or passed by. The user had to save it in a memory card for later review. In this embodiment, a button (hereinafter, "just-before playback button") for requesting playback of a portion just before (hereinafter, "just-before playback") is provided in the drive recorder 10, etc. The user can use the just-before playback button to request instant playback of the portion just before (just-before portion) even while the video is being captured. The just-before playback button may be provided in the main body of the drive recorder 10 as a button dedicated to the purpose. Alternatively, the ordinary playback button may also function as the just-before playback button and provided in the main body of the drive recorder 10. In the case of a button with double functions, pressing the button once may request ordinary playback. The button may function as the just-before playback button only when the button is pressed long or pressed twice successively. The period of time that the apparatus goes back until the point of time of start to playback may be extended in steps of 10 seconds, depending on the duration of long pressing or the number of times of successive pressing. In one variation, the video may be played back in reverse from the group of pictures (GOP) immediately before the point being recorded while the just-before playback button is being pressed long and may be played back normally from the point of time when the long pressing is canceled. In that case, the video may be played back in reverse as in the case of fast rewind, by displaying only key frames included in the GOP. The just-before playback button may be displayed on the touch panel of the display apparatus 49 included in the drive recorder 10, the navigation apparatus 11, or an information terminal such as a cellular phone so that the user can use the button. Alternatively, the user operation reception unit 26 may receive a request for just-before playback by a sound input via the microphone 44.

When the user operation reception unit 26 receives a request for just-before playback while the video is being recorded, the recording control unit 20 sets a subsequent moving image file that will be a new video recording destination and changes the recording destination accordingly. The recording control unit 20 closes the preceding moving image file that has been the recording destination. The display control unit 28 plays back the video, starting at a point of time reached by going back from the end of the preceding moving image file, which is closed, by a predetermined period of time (e.g., 20 seconds). When the recording position at the point of time when just-before playback is requested is reached, the display control unit 28 stops playing back the file. In one variation, the video may be played back until a predetermined period of time (e.g., 10 seconds) elapses from the point of time when just-before playback is requested. When the point of time reached by going back a predetermined period of time is included in a moving image file preceding the preceding moving image file and is before a predetermined criterion, the recording control unit 20 does not change the recording destination to the subsequent moving image file in response to a request to play back the just-before portion. More specifically, when the point of time reached by going back a predetermined period of time is included in a moving image file preceding the preceding moving image file, and, when recording in the preceding moving image file could end by the time the end of the preceding moving image file is reached since playback is started at the point of time reached by going back the predetermined period of time, the recording control unit 20 does not change the recording destination to the subsequent moving image file in response to a request to play back the just-before portion. When the specification of the apparatus is such that moving image files are segmented every one minute, and, when the period of time that the apparatus goes back for just-before playback is one minute, which is equal to the duration of the moving image file, or longer, the just-before portion included in the preceding moving image file can be played back without changing the recording destination to the subsequent moving image file. The detail will be described with reference to FIG. 3.

When the recording control unit 20 changes the recording destination to the subsequent moving image file in response to a request to play back the just-before portion, the recording control unit 20 combines the preceding moving image file with the subsequent moving image file after the playback of the just-before portion is terminated. To ensure that the moving image file resulting from the combination will be a one-minute file, the duration of the subsequent moving image file is determined to be a duration shorter than one minute and dependent on the duration of the preceding moving image file, i.e., to be a duration derived from subtracting the duration of the preceding moving image file from one minute. In one variation, the subsequent moving image file may be configured as a one-minute file as normal, on an assumption that the preceding moving image file and the subsequent moving image file are not combined after the just-before played back.

The recording control unit 20 sets an overwrite disabled save format in the moving image file subject to just-before playback. In this case, the entirety of the moving image file subject to just-before portion may be overwrite-disabled. Only the portion subject to just-before playback may be overwrite-disabled. Alternatively, the portion may be clipped from the original moving image file and saved in an overwrite-disabled format. The event detection unit 18 may detect a request from the user for just-before playback as a trigger event and set, in response to the detection, an overwrite disabled save format in the moving image file subject to just-before playback. An upper limit to the number of moving image files set to an overwrite disabled format in response to designation of the file as a subject of just-before playback may be defined. The upper limit to the number of files is, for example, ten. The user may be allowed to select whether to set the moving image file subject to just-before playback in an overwrite disabled format. For example, a message "Save the file?" may be displayed on the screen when the just-before playback ends, and the file may be set in an overwrite disabled format only when the user selects to save the file. Those of moving image files subject to just-before playback that are saved in an overwrite disabled format may be saved as still image files instead of moving image files. In this case, the user may be allowed to designate a scene that is saved in a still image file. For example, the playback may be temporarily suspended at a position designated by the user during the just-before playback, the area designated by the user may be displayed on an enlarge scale, and a clip from the enlarged area may be saved in a still image file.

Figure 2:
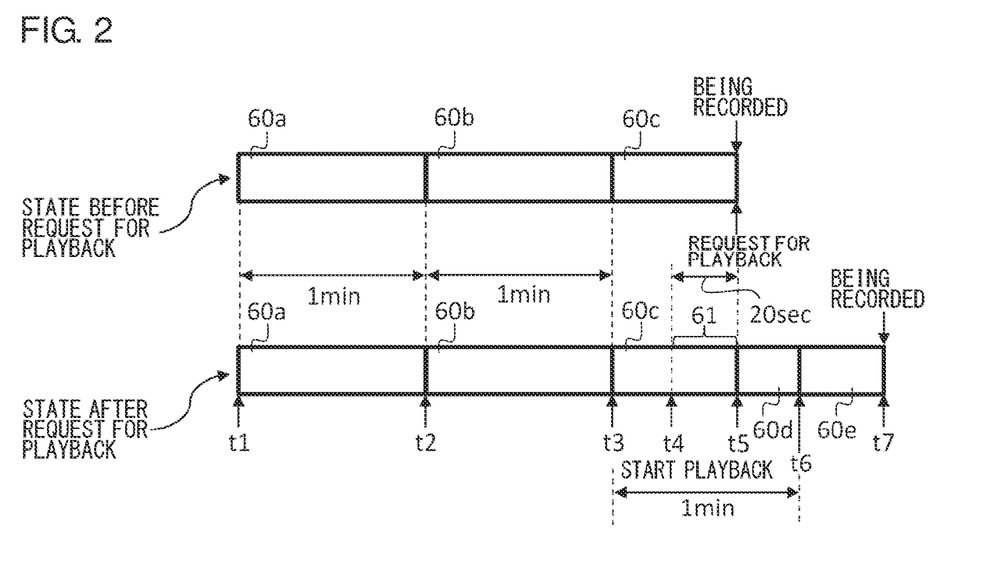
FIG. 2 shows the first example of temporal relationship between a video recording process and a playback process.

FIG. 2 shows the first example of temporal relationship between a video recording process and a playback process. The upper part of the figure shows a state occurring before a request for playback, and the lower part shows a state occurring after a request for playback. In both parts, recording is started at the left end, and the right end indicates a position being recorded. As shown in the upper part of the figure, the recording control unit 20 starts recording a video, designating a first moving image file 60a as a recording destination (t1). One minute after, the recording control unit 20 segments the moving image file (t2), sets a second moving image file 60b, a new recording destination, and continues recording by using the second moving image file 60b as a new recording destination. One more minute after, the recording control unit 20 segments the moving image file (t3), sets a third moving image file 60c, a new recording destination, and continues recording by using the third moving image file 60c as a new recording destination. When the user issues a request for just-before playback at an arbitrary point of time t5 while the video is being recorded, the recording control unit 20 closes the third moving image file 60c and appends information indicating an end to the closed file, as shown in the lower part. The recording control unit 20 sets a fourth moving image file 60d, a new recording destination, and continues recording the video by using the fourth moving image file 60d as a new recording destination. Concurrently, as shown in the lower part, the display control unit 28 plays back a just-before portion 61 immediately preceding the point of time t5 when a request for playback is issued, i.e., a portion of 20 seconds from a point of time t4, reached by going back 20 seconds from t5, to t5. Even while the display control unit 28 plays back the just-before portion 61, the recording control unit 20 continues recording the video in the fourth moving image file 60d. The remaining recording time of the fourth moving image file 60d is determined such that the third moving image file 60c and the fourth moving image file 60d combined later will result in a one-minute file. When the recording time has elapsed (t6), a fifth moving image file 60e, a new recording destination, is set, and recording is continued, with the fifth moving image file 60e as a new recording destination (t7).

When playback of the just-before portion 61 and recording in the fourth moving image file 60d end, the recording control unit 20 combines the third moving image file 60c and the fourth moving image file 60d to produce a single moving image file (t3-t6). The recording control unit 20 sets an over-write disabled save format in this moving image file. This ensures that all moving image files have a duration of one minute regardless of whether a request for playback is issued in the moving image file. In one variation, the subsequent moving image files, including the fourth moving image file 60d, may be configured as a one-minute file as normal, on an assumption that the moving image file, for which a request for just-before playback is issued, and the subsequent moving image file are not combined. In this case, the third moving image file 60c, for which a request for just-before playback is issued, remains as a moving image file of less than one minute even after the playback. In another variation, when the point of time reached by going back a predetermined period of time from the point of time t5 when a request for just-before playback is issued is included in the preceding, second moving image file 60b, the third moving image file 60c recording the video may not be closed, and playback may be started without a subsequent moving image file being set as a new recording destination. In this case, a subsequent moving image file, a new recording destination, is set at a point of time when the playback position approaches the end of the second moving image file 60b, the recording destination is changed, and the third moving image file 60c is closed. It should be noted that these processes are executed in the case the specification defines going back less than one minute when a request for just-before playback is issued. When the specification defines going back one minute or more, control as shown in FIG. 3 described later is performed.

FIG. 3 shows the second example of temporal relationship between a video recording process and a playback process. The upper part of the figure shows a state occurring before a request for playback is issued, and the lower part shows a state occurring after a request for playback is issued. In both parts, recording is started at the left end, and the right end indicates a position being recorded. FIG. 3 illustrates an example in which playback is started at a point of time reached by going back one minute when a request for just-before playback is issued. As shown in the upper part of the figure, the recording control unit 20 starts recording a video, designating a sixth moving image file 62a as a recording destination (t11). One minute after, the recording control unit 20 segments the moving image file (t12), sets a seventh moving image file 62b, a new recording destination, and continues recording by using the seventh moving image file 62b as a new recording destination. One more minute after, the recording control unit 20 segments the moving image file (t14), sets an eighth moving image file 62c, a new recording destination, and continues recording by using the eighth moving image file 62c as a new recording destination. When the user issues a request for just-before playback at an arbitrary point of time t15 while the video is being recorded, the recording control unit 20 plays back, as shown in the lower part, a one-minute just-before portion 63, starting at the position of t13, which is a point of time reached by going back one minute from the point of time t15. The position of t13 is included in the seventh moving image file 62b preceding the eighth moving image file 62c, in which the video is being recorded, by one step. It would therefore not be necessary to take an extra step of closing the eighth moving image file 62c for the purpose of playing back the seventh moving image file 62b, starting at t13. Recording of the video in the eighth moving image file 62c can continue (t16) even after a request for playback at t15 (t16). It should also be noted that a time α elapsed since the playback is started at t13 until t14, i.e., the end of the seventh moving image file 62b, is equal to a time β elapsed since the point of time t15 when a request for playback is issued until the point of time t17 when the eighth moving image file 62c is scheduled to end. In other words, the recording control unit 20 can end recording in the eighth moving image file 62c and close the eighth moving image file 62c before the end of playback of the seventh moving image file 62b, which started at t13. Thus, in the case the video is played back by going back one minute or more from the point of time t15, when a request for playback is issued, the seventh moving image file 62b preceding the eighth moving image file 62c by one step may be played back without closing the eighth moving image file 62c, in which the video was being recorded. The portion between t14 and t15 can be played back in continuation from the seventh moving image file 62b, across the point of time when the recording in the eighth moving image file 62c ends. While FIG. 3 shows an example in which the video is played back from a point of time reached by going back one minute, but similar control can be performed in the case where the video is played back from a point of time reached by going back longer time, i.e., going back one or more files. For example, in the case the user issues a request to go back two minutes for just-before playback at an arbitrary point of time t15 while the video is being recorded, the recording control unit 20 may play back, as a just-before portion, the two-minute portion from a position reached by going back as far as the sixth moving image file 62a, which precedes the eighth moving image file 62c, in which the video is being recorded, by two steps.

Figure 4:
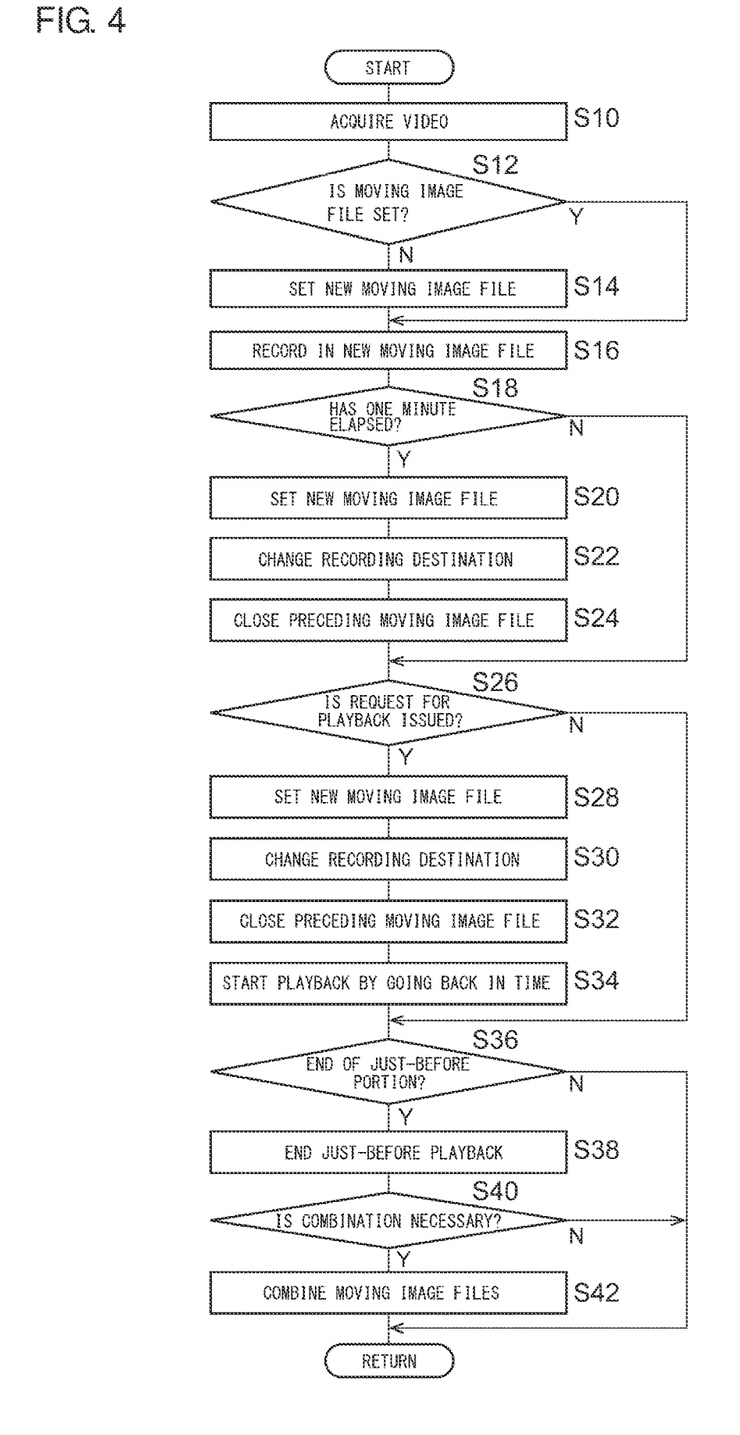
FIG. 4 is a flowchart showing a step of recording a video and a step of playback.

FIG. 4 is a flowchart showing a step of recording a video and a step of playback. The image acquisition unit 12 acquires a video (S10). When a moving image file that will be a video recording destination is not set (N in S12), the recording control unit 20 sets a new moving image file (S14) and records the video in the moving image file (S16). When it is determined that a moving image file is set in S12, S14 is skipped (Y in S12), and the video is recorded in the moving image file (S16). When one minute has elapsed while the video is recorded in the moving image file (Y in S18), the recording control unit 20 sets a new subsequent moving image file (S20), changes the video recording destination to the subsequent moving image file (S22), and closes the preceding moving image file (S24). When one minute has not elapsed in S18, S20-S24 are skipped (N in S18). When the user issues a request for just-before playback (Y in S26), the recording control unit 20 sets a new subsequent moving image file (S28), changes the video recording destination to the subsequent moving image file (S30), closes the preceding moving image file (S32), and the display control unit 28 starts playing back the video by going back a predetermined period of time (S34). When there is not a request for playback in S26, S28-S34 are skipped (N in S26). When the playback position reaches the end of the just-before portion (Y in S36), the just-before playback is terminated (S38). When a combination of moving image files is necessary (Y in S40), the preceding moving image file and the subsequent moving image file are combined (S42). When a combination is not necessary, S42 is skipped (N in S40). When the end of the just-before portion is not reached in S36, S38-S42 are skipped (N in S36). Control exits the flow of FIG. 4, returns to the start, and repeats the flow of FIG. 4.

As described above in the embodiments, a video just before can be played back while an image of the scene around the vehicle is being captured. Thus, when there is a scene that the user wants to see a scene (e.g., a scenery that the driver overlooked while driving the vehicle, a landmark object that the user passed by, etc.) once again, the user can instantly playback a video just before with a simple user operation. Even when a moving image file is divided to play back the just-before portion, the impact on file management from playing back the file in the middle can be minimized by combining the divided moving image file with the subsequent moving image file. Further, by adjusting the method of playing back the just-before portion, an unnecessary step of dividing a moving image file can be eliminated, and the impact on file management can be minimized.

Described above is an explanation based on an exemplary embodiment. The embodiment is intended to be illustrative only and it will be understood by those skilled in the art that various modifications to constituting elements and processes could be developed and that such modifications are also within the scope of the present invention.

What is claimed is:

1. A recording control apparatus comprising:
    an image acquisition unit that acquires a video of a scene around a vehicle while the video is being captured;
    a recording control unit that sets a moving image file for recording the video being captured and acquired by the image acquisition unit, segmenting the video into predetermined units and records the video being captured in the moving image file until the predetermined unit is met;
    a display control unit that plays back the video recorded in the moving image file; and
    a user operation reception unit that receives a user operation input from a user, wherein
    when the user operation reception unit receives a request to play back a just-before portion from a user while the video is being recorded,
    the recording control unit sets a subsequent moving image file that will be a new recording destination of the video to switch to the new recording destination, and closes a preceding moving image file that has been a recording destination, and
    the display control unit plays back the video, starting at a point of time reached by going back from an end of the preceding moving image file by a predetermined period of time.

2. The recording control apparatus according to claim 1, wherein
    when the point of time reached by going back a predetermined period of time is included in a moving image file preceding the preceding moving image file by one step or more and is before a predetermined criterion, the recording control unit does not switch the recording destination to the subsequent moving image file in response to the request to play back the just-before portion.

3. The recording control apparatus according to claim 1, wherein when the recording control unit switches the recording destination to the subsequent moving image file in response to the request to play back the just-before portion, the recording control unit combines the preceding moving image file with the subsequent moving image file after playback of the just-before portion is terminated.

4. A recording control method comprising:

acquiring a video of a scene around a vehicle while the video is being captured;

setting a moving image file for recording the video being captured, segmenting the video into predetermined units;

recording the video being captured in the moving image file until the predetermined unit is met;

playing back the video recorded in the moving image file; and when a request to play back a just-before portion is received from a user while the video is being recorded, setting a subsequent moving image file that will be a new recording destination of the video to switch to the new recording destination, and closing a preceding moving image file that has been a recording destination, and playing back the video, starting at a point of time reached by going back from an end of the preceding moving image file by a predetermined period of time.

5. A non-transitory computer-readable storage medium storing a recording control program comprising computer-implemented modules including:

an acquisition module that acquires a video of a scene around a vehicle while the video is being captured;

a recording module that sets a moving image file for recording the video being captured, segmenting the video into predetermined units and records the video being captured in the moving image file until the predetermined unit is met;

a playback module that plays back the video recorded in the moving image file; and a reception module that receives a user operation input from a user, wherein when a request to play back a just-before portion is received from a user while the video is being recorded, the recording module sets a subsequent moving image file that will be a new recording destination of the video to switch to the new recording destination and closes a preceding moving image file that has been a recording destination, and the playback module plays back the video, starting at a point of time reached by going back from an end of the preceding moving image file by a predetermined period of time.

\* \* \* \* \*